US006710131B2

(12) United States Patent
Sodagudi et al.

(10) Patent No.: US 6,710,131 B2
(45) Date of Patent: Mar. 23, 2004

(54) MELT PROCESSIBLE THERMOPLASTIC POLYOLEFIN BLENDS FOR CAR BUMPERS AND OTHER ARTICLES AND A PROCESS FOR THE PREPARATION THEREOF

(75) Inventors: Francis Xavier Sodagudi, Gujarat (IN); Pendyala Veera Nageswara Sastry, Gujarat (IN)

(73) Assignee: Indian Petrochemicals Corporation Limited, Gujarat (IN)

( * ) Notice: Subject to any disclaimer, the term of this patent is extended or adjusted under 35 U.S.C. 154(b) by 14 days.

(21) Appl. No.: 10/165,618

(22) Filed: Jun. 7, 2002

(65) Prior Publication Data

US 2003/0092839 A1 May 15, 2003

(30) Foreign Application Priority Data

Nov. 7, 2001 (IN) ................................. 1067/MUM/2001

(51) Int. Cl.$^7$ ............................ C08L 9/00; C08L 23/00; C08L 23/04; C08F 8/00
(52) U.S. Cl. ..................... 525/191; 525/192; 525/197; 525/232; 525/240; 524/424; 524/425; 524/449; 524/451
(58) Field of Search .................. 525/191, 192, 525/197, 232, 240; 524/424, 425, 449, 451

(56) References Cited

U.S. PATENT DOCUMENTS 4,329,388 A * 5/1982 Vicik et al. ................. 428/216
4,493,923 A * 1/1985 McCullough, Jr. ........... 525/88
5,030,694 A * 7/1991 Kelley ......................... 525/194

FOREIGN PATENT DOCUMENTS

| EP | 0373834 | 6/1990 |
| EP | 0435247 | 7/1991 |
| JP | 1-271450 | 10/1989 |
| JP | 2-191656 | 7/1990 |
| JP | 3-252436 | 11/1991 |
| JP | 4-214711 | 8/1992 |

* cited by examiner

*Primary Examiner*—Nathan M. Nutter
(74) *Attorney, Agent, or Firm*—Darby & Darby

(57) ABSTRACT

A melt processable thermoplastic blend and a process for the preparation thereof is disclosed. The blend comprises an intimate mixture of polypropylene copolymer, EPDM and other additives and exhibits suitable flow properties as well as mechanical properties (such as melt flow index: 10–15 g/10 minutes; flexural modulus: 8000–15000 kg/cm$_2$; (notched Izod impact strength: 50–60 kg.cm/cm; and heat deflection temperature: 60–105° C.) necessary for injection molding of car bumpers as well as their property requirements. It is prepared by extruding the components in a twin screw extruder or a Buss co-kneader all together or in separate batches, while for example, the twin screw temperature is maintained in the range of 180 to 250° C. and the screws are rotated at a speed of 50 to 100 rpm.

30 Claims, No Drawings

MELT PROCESSIBLE THERMOPLASTIC POLYOLEFIN BLENDS FOR CAR BUMPERS AND OTHER ARTICLES AND A PROCESS FOR THE PREPARATION THEREOF

FIELD OF THE INVENTION

The present invention relates to melt processable thermoplastic polyolefin blends and a process for the preparation of a melt processable thermoplastic polyolefin blend. More particularly, the present invention relates to a process for the preparation of a polypropylene copolymer blend with EPDM and other ingredients using a twin screw extruder or Buss co-kneader. The blends of this invention exhibit very high impact strength at moderate concentrations of EPDM and enable injection molding, thermoforming and other conventional techniques to be applied for making end products that demand high impact strength such as bumpers for cars/jeeps and other light automobile vehicles.

BACKGROUND OF THE INVENTION

In the early 1970's interesting opportunities arose in the automotive field for plastic materials having a specific requirement with respect to weight reduction, safety, production and maintenance costs. The first application was that of bumpers. Automobile bumpers were traditionally made of chromium plated metal and thus were heavy, expensive and too stiff. The use of polymer blends such as elastomer modified polypropylene in place of metal solved a majority of these problems. Elastomer modified isotactic polypropylene exhibits considerable impact strength, good dimensional stability, low weight, low production and maintenance costs.

Significant developments took place in Italy in respect of plastic automobile bumpers. The consumption of elastomer modified polypropylene expanded rapidly in Italian and then in other European markets. Other thermoplastic materials, particularly modified polycarbonate and modified polybutylene terephthalate were also considered for similar applications. However, elastomer modified polypropylene offered the same performance at a substantially lesser cost.

Plastic automobile bumpers entered the Indian market along with the Maruti car production in India. Initially, the bumpers were molded in India with an imported blend from Japan. JP 04,214,711 (1992) describes blends of thermoplastic polyolefins, polyurethanes from polyols, non-aromatic polyisocyanates and low molecular weight polyamines exhibiting appreciable impact strength and coatability properties. JP 03, 252, 436 (1991) claimed blends of ethylene-propylene block copolymer, ethylene-propylene rubber, non-crystalline nylon and modified polypropylene exhibiting excellent heat and impact resistance properties. JP 02,191,656 (1990) describes compounds of thermoplastic resins, rubbers, cross-linking monomers, and other additives possessing very high impact strength. JP 01,271,450 (1989) claims blends of ethylene-propylene block copolymer, ethylene-propylene rubber and talc exhibiting excellent impact strength and flexural modulus. U.S. Pat. No. 5,030,694 (1991) describes blends of ethylene-propylene copolymer with EPDM and organic peroxides exhibiting good melt flow, impact strength and flexural modulus. EP 435,247 (1991) illustrates blends of propylene polymer and multiphase propylene-vinyl monomer graft copolymer exhibiting good moldability, impact resistance and heat resistance properties. EP 373,834 (1990) describes compounds of hydrogenated diene-alkyl aromatic compound polymer, propylene polymer and polyoxyphenylene, polyamides, or thermoplastic polyesters possessing good impact strength.

In all the patents described above, the primary aim was to improve impact resistance. In an automobile bumper application, the primary concern is impact resistance (the item must remain undamaged when subjected to an impact of 4 kmph at −23° C., according to European regulations). In addition, higher stiffness, better aesthetics and environmental resistance are also important considerations. Further, since the bumper is to be assembled with metal parts, low linear thermal expansion coefficient is also required. Moreover, given that wide and thin shape of the bumper mold, enhanced flow at the molding temperature is also required.

The present invention takes into account all the above considerations in mind. The blends prepared in the invention can also be used for applications other than car bumpers where similar properties are required such as for molded luggage, furniture, automotive components and body panels and the like.

OBJECTS OF THE INVENTION

It is an object of this invention to provide blends of polypropylene copolymer with EPDM and other additives that allow injection molding, compression molding, thermoforming and other conventional techniques to be applied for making end products such as car bumpers that require, inter alia, high impact resistance.

It is another object of the invention to provide a process for the preparation of blends suitable for making car bumpers by injection molding.

It is another object of the invention to provide an improved process for the preparation of a blend with polypropylene copolymer, EPDM and other additives that exhibits suitable flow properties as well as mechanical properties (such as melt flow index: 10–15 g/10 minutes; flexural modulus: 8000–15000 kg/cm$_2$; (notched Izod impact strength: 50–60 kg.cm/cm; and heat deflection temperature: 60–105° C.) necessary for injection molding of car bumpers as well as their property requirements.

It is another object of the present invention to provide an improved process for the preparation of blends for use in manufacture of car bumper with moderate concentrations of EPDM, filler, carbon black, and an organic peroxide using a twin screw extruder or a Buss co-kneader.

SUMMARY OF THE INVENTION

The present invention provides polypropylene copolymer blends with EPDM with or without a filler, carbon black, and an organic peroxide as well as a process for the preparation thereof by extruding the components in a twin screw extruder or a Buss co-kneader all together or in separate batches, while for example, the twin screw temperature is maintained in the range of 180 to 250° C. and the screws are rotated at a speed of 50 to 100 rpm.

Accordingly, the present invention relates to melt processable thermoplastic polyolefin blends comprising an intimate mixture of ethylene-propylene diene monomer (EPDM) in an amount of 5 to 25% by wt and a base block copolymer in an amount of 95 to 55% by wt, the balance if any comprising one or more conventional additives such as herein described, the polyolefin blend having a melt flow index in the range of 10 to 15 g/10 minutes when tested according to ASTM D1238.

The present invention also provides a process for the preparation of a melt processable thermoplastic polyolefin blend comprising, blending a base-block copolymer in an amount of 55 to 95% by wt of the total blend and EPDM in an amount of 25 to 5% by wt of the total blend, the balance if any comprising one or more of conventional additives, fillers, anti-oxidants, carbon black, melt flow enhancing additives.

In one embodiment of the invention, the blend has one or two melting peaks in the range of 160 to 170° C. when tested in a differential scanning calorimeter at a uniform heating rate of 10° C./minute in nitrogen environment.

In another embodiment of the invention, the ethylene content in EPDM is in the range of 55 to 65 wt %.

In yet another embodiment of the invention, the base block copolymer is a copolymer of ethylene and propylene.

In a further embodiment of the invention, an organic peroxide is added to the blend during blending operation in order to improve the melt flow index thereof.

In a further embodiment of the invention, the organic peroxide is selected from the group consisting of dicumyl peroxide, 2,5-dimethyl-2,5-di(tert.butyl peroxy)hexane and ditertiary butyl peroxide in the range of 0 to 2 wt %.

In yet another embodiment of the invention, carbon black is added in an amount of 0 to 20, preferably 12 wt % as a conventional additive.

In a further embodiment of the invention, conventional additive comprises of natural filler in an amount of 0 to 20 wt % and is selected from the group consisting of talc, calcium carbonate and mica.

In one embodiment of the invention, the polypropylene copolymer has a melt flow index in the range of 1 to 4 g/10 minutes; when tested at 230° C. at 2.16 kg. load (according to ASTM D1238); and ethylene-propylene diene monomer (EPDM) with ethylene content in the range of 55 to 65 wt % possessing specific gravity 0.86 to 0.90; and Mooney viscosity in the range of 36 to 77 [$ML_{(1+4)}$125° C.]; with or without carbon black incorporated in an amount of 0 to 12 wt %.

In another embodiment of the invention, the blends comprise EPDM as an ingredient in a concentration of 5 to 25 wt %.

In another embodiment of the invention, the blends possess density in the range of 0.92 to 0.96 g/cc while their base polymer polypropylene copolymer has 0.90 g/cc density when tested according to ASTM D792.

In another embodiment of the invention, the blends exhibit melt flow rate in the range of 10 to 15 g/10 minutes when tested according to ASTM 1238.

In yet another embodiment of the invention, the blends exhibit an Izod impact strength (notched specimens) in the range of 50 to 60 kg.cm/cm when tested on injection molded specimens of 3.2 mm thickness (cut from mid portion of the injection molded tensile bars of Type-I according to ASTM D638) according to ASTM D256.

In yet another embodiment of the invention, the polyolefin blends exhibit tensile strength in the range of 170 to 250 kg/cm$^2$, when tested according to ASTM D638 method.

In another embodiment of the invention, the blends possess flexural modulus in the range of 8000 to 15000 kg/cm$^2$, when tested according to ASTM D790.

In a further embodiment of the invention, the blends show heat deflection temperature in the range of 55 to 65° C. with 18.2 kgf/cm$^2$ stress; or 60 to 105° C. with 4.6 kgf/cm$^2$ stress according to ASTM D648.

DETAILED DESCRIPTION OF THE INVENTION

This invention was carried out using a polyolefin polymer such as a polypropylene-ethylene block copolymer obtained in the form of granules after adequately adding stabilizers and antioxidants after polymerisation in the plant. The granules are dried at 80±5° C. for a period of two hours, preferably in an oven with air circulation facility. Ethylene-propylene diene monomer (EPDM) elastomer obtained in the form of granules was also dried separately in an oven at a preferred temperature of 80±5° C. for a period of at least two hours. Similarly, a natural filler selected from the group consisting of mica, talc and calcium carbonate, preferably with a particle size in the range of 10 to 20 microns and carbon black were also dried at the above mentioned temperature and time.

The objective of melt blending is to break the elastomer (EPDM) into as fine particles as possible and to disperse them uniformly in the polypropylene block copolymer matrix. This is achieved by means of a twin screw extruder or a Buss co-kneader with a specially designed screw profile that facilitates intimate mixing of the ingredients.

A typical most preferred blend in accordance with the present invention is prepared as follows with the amount of each ingredient being as indicated below:

| | |
|---|---|
| PPBC | 75 to 95 wt % |
| EPDM | 25 to 5 wt % |
| filler | 0 to 20 wt % |
| carbon black | 0 to 20 wt % |
| initiator, sulfur, and other additives such as glycerin monostearate, calcium stearate, Tinuvin-770, Tinuvin-327, B-blend-225 and Chimmasorb, a combination of Tinuvin-622 and benzophenone, | 0.01 to 0.1 phr each |

The above ingredients are tumble mixed. A co-rotating twin screw extruder with a screw profile that would enhance intimate mixing of the ingredients was used later. Preferably, the extruder temperature is maintained in the range of 180 to 250° C.; screw speed is preferably 50 to 100 rpm and the residence time is preferably 0.5 to 5.0 minutes. The extrudate is dipped in circulating cold water and later chopped into granules of length of 3 to 4 mm.

The blends may also preferably include an organic peroxide selected from the group consisting of dicumyl peroxide, 2,5-dimethyl-2, 5-di(tert.butyl peroxy)hexane and ditertiary butyl peroxide in the range of 0 to 2 wt % so as to selectively cut down the long chains of the base polymer so that the melt flow index of the product blend is enhanced without significant deterioration of the mechanical properties thereof.

The dried extrudate granules are injection molded into ASTM standard test specimens for the evaluation of properties such as tensile, flexural, Izod impact, heat deflection temperature and the like. Dry granules are also used to measure melt flow index, crystallisation kinetics (usign differential scanning calorimeter), filler content (using thermogravimetric analyser), dispersion of EPDM and filler in the PPBC matrix (using polarized optical microscope), and the like.

Injection molding is preferably carried out using a computer controlled injection molding machine with a temperature profile (with four heating zones) in the range of 180 to 230° C.; injection pressure (applied in six stages) of 15 to 125 Kg/Cm$^2$, injection time (in six stages) of 2.5 to 5.0 sec with screw speed (in two stages) in the range of 80 to 100 rpm. Standard test specimens thus obtained were used for evaluating various performance properties of the blends following the ASTM standard test methods.

The principal performance property required for a bumper application is impact resistance. The elastomer concentration as well as its particle size in the blend is found to play a prominent role in controlling the mechanisms that affect the toughness of the matrix. The phenomenon of craze initiation in PPBC is greatly dependant on the EPDM particle size. It is recognised, in general, that there appears to be an optimum size of rubber particles for toughening the rubber modified polymers. In the case of notched Izod impact strength, reduction in rubber particle size has gradually increased the strength. With reduction in EPDM particle size, the number of particles has increased and the inter-particulate distance has reduced. The multiple crazing in the blend gets further enhanced with the increased number of rubber particles and also reduced particle size. The shear yielding, which was observed in scanning electron microscope on fracture surfaces, also gets influenced with change in particle size resulting in increased impact strength. Further, blending of PPBC with EPDM does not influence the crystalline structure significantly, as observed on hot-stage optical microscope and DSC cooling thermograms. However, the β-content of the PPBC increases due to the reduction in the EPDM particle size. As a result of thermal and mechano-chemical oxidation reactions in the presence of sulfur, the EPDM gets cross-linked during blending. Cross-linked EPDM gets dispersed in the matrix as spherical particles, contributing to the rise in impact resistance of the blends. The presence of fillers imparts high flexural modulus and heat deflection temperature, whereas carbon black offers resistance to ultra violet radiation. Other additives are used to provide high flow property as well as long term stability to the blend.

The present invention will now be described with reference to the following examples, which along with the foregoing preferred embodiments are illustrative and should not be construed as limiting the scope of the invention. Various alterations and modifications will be apparent to those skilled in the art and fall within the scope of the invention herein.

EXAMPLE 1

Pre-dried granules of polypropylene copolymer in an amount of about 95 wt % were mixed with dry EPDM (about 2 wt %) and a natural filler (Talc, about 2.5 wt % and carbon black (about 0.5 wt %). Then an organic peroxide (dicumyl peroxide) was carefully weighed (0.3% by wt) and added to the rest of the mixtureand all the constituents were tumble mixed thoroughly. The dry mixture was then extruded in a co-rotating twin screw extruder with a preferred screw profile. The extrusion was carried out with the extruder operating at a temperature in the range of 125 to 230° C. with screws rotating at 60 to 100 rpm. The extrudate strand (named Blend A) was dipped in a trough of water that was circulated to keep it cool. The strand was then dried and granulated.

Standard ASTM test specimens were prepared by injection molding the dry granules of Blend A obtained above under molding conditions given below in Table 1 using a FRK-85, Klockner-Windsor injection molding machine.

TABLE 1

Typical injection molding conditions for preparing ASTM test specimens

| No. | Processing parameter | Units | Typical Value |
|---|---|---|---|
| 1 | Injection pressure | kg/cm² | 70–100 |
| 2 | Injection speed | cm/min | 6–10 |

TABLE 1-continued

Typical injection molding conditions for preparing ASTM test specimens

| No. | Processing parameter | Units | Typical Value |
|---|---|---|---|
| 3 | Temperature maintained | ° C. | 150–230 |
| 4 | Injection time | seconds | 2–7 |
| 5 | Cooling time | seconds | 30–90 |
| 6 | Screw speed | Rpm | 80–100 |

Properties of blends injection molded ta above conditions are given in Table 2.

TABLE 2 typical properties of Blend A

| No. | Property | Unit | ASTM method | Blend A |
|---|---|---|---|---|
| 1 | Melt flow index | g/10 min | D1238 | 11 |
| 2 | Tensile strength | kg/cm² | D638 | 181 |
| 3 | Tensile modulus | kg/cm² | D638 | 13681 |
| 4 | Flexural strength | kg/cm² | D790 | 262 |
| 5 | Flexural modulus | kg/cm² | D790 | 14411 |
| 6 | Notched Izod impact strength | kg · cm/cm | D256 | |
|  | 3.2 mm thick specimen* | | | 56 |
|  | 6.4 mm thick specimen | | | 35 |
| 7 | Heat deflection temperature at | ° C. | D648 | |
|  | 4.6 kgf stress | | | 95 |
|  | 18.2 kgf stress | | | 57 |

*middle portion of the injection molded ASTM standard tensile test specimen was used.

EXAMPLE 2

Dry granules of polypropylene copolymer (85 wt %) were mixed with dry EPDM of 6.5 wt % concentration and dry natural filler (7.5 wt %) and carbon black (1 wt %). To this mixture, an peroxide different from the one used in Example 1 (2,5-dimethyl-2,5-di(tert.butyl peroxy) hexane was added in an amount of 0.5% by wt of the composition and all the constituents were extruded after thoroughly tumble mixing using the same extruder and same extrusion conditions as in Example 1. The extrudate strand (named Blend B) was also granulated following the same procedure as in the previous example. Standard ASTM test specimens were prepared using the same injection molding machine operating under the same molding conditions as in Example 1. The properties of Blend B are given in Table 3 below.

TABLE 3

Typical properties of Blend B

| No. | Property | Unit | ASTM method | Blend A |
|---|---|---|---|---|
| 1 | Melt flow index | g/10 min | D1238 | 10 |
| 2 | Tensile strength | kg/cm² | D638 | 184 |
| 3 | Tensile modulus | kg/cm² | D638 | 13836 |
| 4 | Flexural strength | kg/cm² | D790 | 266 |
| 5 | Flexural modulus | kg/cm² | D790 | 14904 |
| 6 | Notched Izod impact strength | kg · cm/cm | D256 | |
|  | 3.2 mm thick specimen* | | | 54 |
|  | 6.4 mm thick specimen | | | 24 |
| 7 | Heat deflection temperature at | ° C. | D648 | |
|  | 4.6 kgf stress | | | 105 |
|  | 18.2 kgf stress | | | 58 |

*middle portion of the injection molded ASTM standard tensile test specimen was used.

EXAMPLE 3

Dry granules of polypropylene copolymer (75 wt %), dried EPDM (15 wt %), dehumidified preferred natural filler (7.5 wt %) and carbon black (1 wt %) were taken and to this mixture a peroxide different from the one used in previous Example (dicumyl peroxide) was added in a range of 0.6 wt % of the reaction mixture. The entire mixture was dry blended thoroughly and then melt extruded using a preferred twin screw extruder or a Buss co-kneader using the same process parameters as in Example 1. The dry extrudate granules (named Blend C) were then injection molded using the same molding machine and operational conditions as in the previous examples. The injection molded samples were used to evaluate the performance properties of Blend C and are given in Table 4 below.

TABLE 4

Typical properties of Blend C

| No. | Property | Unit | ASTM method | Blend A |
|---|---|---|---|---|
| 1 | Melt flow index | g/10 min | D1238 | 13 |
| 2 | Tensile strength | kg/cm$^2$ | D638 | 200 |
| 3 | Tensile modulus | kg/cm$^2$ | D638 | 7835 |
| 4 | Flexural strength | kg/cm$^2$ | D790 | 217 |
| 5 | Flexural modulus | kg/cm$^2$ | D790 | 8120 |
| 6 | Notched Izod impact strength<br>3.2 mm thick specimen*<br>6.4 mm thick specimen | kg · cm/cm | D256 | 58<br>32 |
| 7 | Heat deflection temperature at<br>4.6 kgf stress<br>18.2 kgf stress | ° C. | D648 | 60 |

*middle portion of the injection molded ASTM standard tensile test specimen was used.

EXAMPLE 4

Polypropylene copolymer (55 wt %), EPDM (25 wt %), filler (16 wt %) and carbon black (4 wt %) were all dried and mixed. To this mixture a peroxide (dicumyl peroxide) was added in amount of 0.5 wt % of the mixture. The entire mixture was dry blended thoroughly and then melt extruded using a preferred twin screw extruder using the same process parameters as in Example 1. The dry extrudate granules (named Blend D) were then injection molded using the same molding machine and operational conditions as in the previous examples. The injection molded samples were used to evaluate the performance properties of Blend D and are given in Table 5 below.

TABLE 5 typical properties of Blend D

| No. | Property | Unit | ASTM method | Blend A |
|---|---|---|---|---|
| 1 | Melt flow index | g/10 min | D1238 | 11 |
| 2 | Tensile strength | kg/cm$^2$ | D638 | 190 |
| 3 | Tensile modulus | kg/cm$^2$ | D638 | 7010 |
| 4 | Flexural strength | kg/cm$^2$ | D790 | 203 |
| 5 | Flexural modulus | kg/cm$^2$ | D790 | 8330 |
| 6 | Notched Izod impact strength<br>3.2 mm thick specimen*<br>6.4 mm thick specimen | kg · cm/cm | D256 | 57<br>50 |
| 7 | Heat deflection temperature at<br>4.6 kgf stress<br>18.2 kgf stress | ° C. | D648 | 99 |

*middle portion of the injection molded ASTM standard tensile test specimen was used.

We claim:

1. Melt processable thermoplastic polyolefin blends comprising an intimate mixture of ethylene propylene diene monomer (EPDM) in an amount of 5 to 25% by wt, a base block copolymer in an amount of 55 to 95% by wt and an additive, the polyolefin blend having a melt flow index in the range of 8 to 15 g/10 minutes when tested according to ASTM D1238.

2. A polyolefin blend as claimed in claim 1 wherein it exhibits at least one, preferably two melting peaks in the range of 160 to 170° C. when tested in a differential scanning calorimeter at a uniform heating rate of 10° C./minute in nitrogen environment.

3. A polyolefin blend as claimed in claim 1 wherein the ethylene content in EPDM is in the range of 55 to 65 wt %.

4. A polyolefin blend as claimed in claim 1 wherein the base block copolymer is a copolymer of ethylene and propylene.

5. A polyolefin blend as claimed in claim 1 further comprising an organic peroxide.

6. A polyolefin blend as claimed in claim 5 wherein said organic peroxide is present in an amount of 0 to 2 wt %.

7. A polyolefin blend as claimed in claim 6 wherein the organic peroxide is selected from the group consisting of dicumyl peroxide, 2,5-dimethyl-2,5-di(tert.butyl peroxy) hexane, di-(2-tert.butyl peroxy isopropyl) benzene and ditertiary butyl peroxide.

8. A polyolefin blend as claimed claim 1 wherein said additive comprises carbon black.

9. A polyolefin blend as claimed in claim 8 wherein said carbon black is present in an amount of 0 to 20 wt %.

10. A polyolefin blend as claimed in claim 1 wherein said conventional additive comprises a natural filler.

11. A polyolefin blend as claimed in claim 10, wherein natural filler is selected from the group consisting of talc, calcium carbonate and mica.

12. A polyolefin blend as claimed in claims 10 wherein said natural filler is present an amount of 0 to 20 wt %.

13. A polyolefin blend as claimed claim 1 wherein the blend possesses density in the range of 0.92 to 0.96 g/cc when tested according to ASTM D792.

14. A polyolefin blend as claimed claim 1 wherein the blend exhibits melt flow rate in the range of 10 to 15 g/10 minutes when tested according to ASTM 1238.

15. A polyolefin blend as claimed in claim 1 wherein the blend exhibits an Izod impact strength for notched specimens in the range of 50 to 60 kg.cm/cm when tested on injection molded specimens of 3.2 mm thickness cut from mid portion of the injection molded tensile bars of Type-I according to ASTM D638 according to ASTM D256.

16. A polyolefin blend as claimed in claim 1 wherein the blend exhibits tensile strength in the range of 170 to 250 kg/cm$^2$, when tested according to ASTM D638 method.

17. A polyolefin blend as claimed in claim 1 wherein the blend possesses flexural modulus in the range of 8000 to 15000 kg/cm$^2$, when tested according to ASTM D790.

18. A polyolefin blend as claimed claim 1 wherein the blend exhibits heat deflection temperature in the range of 55 to 65° C. with 18.2 kgf/cm$^2$ stress, or 60 to 105° C. with 4.6 kgf/cm$^2$ stress according to ASTM D648.

19. A process for the preparation of a melt processable thermoplastic polyolefin blend which comprises, blending a base-block copolymer in an amount of 55 to 95% by wt of the total blend and ethylene propylene diene monomer (EPDM) in an amount of 5 to 25% by wt, with one or more of additives, fillers, anti-oxidants, carbon black or melt flow enhancing additives.

20. A process as claimed in claim 19 wherein the ethylene content in EPDM is in the range of 55 to 65 wt %.

21. A process as claimed in claim 19 wherein the base-block copolymer is a copolymer of ethylene and propylene.

22. A process as claimed in claim 19 wherein said blending operation is carried out in the presence of an organic peroxide in order to improve the melt flow index thereof.

23. A process as claimed in claim 22 wherein the organic peroxide is selected from the group consisting of dicumyl peroxide, 2,5-dimethyl-2, 5-di(tert.butyl peroxy)hexane, di-(2-tert.butyl peroxy isopropyl) benzene and ditertiary butyl peroxide.

24. A process as claimed in claim 23 wherein said organic peroxide is added in an amount in the range of 0–2 wt %.

25. A process as claimed in claim 19 is wherein said additive is present in amount in the range of 0 to 20 wt %.

26. A process as claimed in any one of claims 19 wherein said blending comprises intimate mixing.

27. A process as claimed in claim 19 wherein said blending is carried out at a temperature in the range of 180 to 250° C.

28. A process as claimed claim 19 wherein said blending is carried out in a twin screw extruder.

29. A process as claimed claim 28 wherein said blending is carried out with the screw speed of said twin screw extruder being 50 to 100 rpm.

30. A process as claimed in claim 28 wherein said blending is carried out at a residence time of from 0.5 to 5.0 minutes.

* * * * *